United States Patent
Pinarbasi

(12) 
(10) Patent No.: US 6,700,757 B2
(45) Date of Patent: Mar. 2, 2004

(54) ENHANCED FREE LAYER FOR A SPIN VALVE SENSOR

(75) Inventor: Mustafa Pinarbasi, Morgan Hill, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 429 days.

(21) Appl. No.: 09/753,968

(22) Filed: Jan. 2, 2001

(65) Prior Publication Data

US 2002/0085322 A1 Jul. 4, 2002

(51) Int. Cl.[7] .................................................. G11B 5/39
(52) U.S. Cl. .................................................. 360/324.12
(58) Field of Search ........................ 360/324.1, 324.11, 360/324.12, 324.2

(56) References Cited

U.S. PATENT DOCUMENTS

| | | |
|---|---|---|
| 5,701,223 A | 12/1997 | Fontana, Jr. et al. |
| 5,871,622 A | 2/1999 | Pinarbasi ............... 204/192.11 |
| 5,903,415 A | 5/1999 | Gill |
| 5,986,858 A | 11/1999 | Sato et al. |
| 5,993,566 A | 11/1999 | Lin ............................. 148/108 |
| 5,998,016 A | 12/1999 | Sasaki et al. ............... 428/336 |
| 6,033,491 A | 3/2000 | Lin ............................. 148/108 |
| 6,134,090 A | 10/2000 | Mao et al. ............... 360/324.1 |
| 6,430,014 B1 * | 8/2002 | Gill ........................ 360/324.12 |
| 6,466,418 B1 * | 10/2002 | Horng et al. .......... 360/324.12 |

FOREIGN PATENT DOCUMENTS

| | | |
|---|---|---|
| DE | 198 18 547 A 1 | 4/1999 |
| EP | 0 606 750 A2 | 12/1993 |
| JP | 2000137906 | 5/2000 |
| JP | 2000252548 | 9/2000 |

OTHER PUBLICATIONS

*IEEE Transactions on Magnetics*, vol. 36, No. 5, Sep. 2000, "Effect of Thin Oxide Capping on Interlayer Coupling in Spin Valves".

*Digest of Technical Papers*, 2000 IEEE Int'l Magnetics Conf., Apr. 2000, "Enhancement of GMR properties of bottom type spin valve films w/ultra thin free layer covered with specular oxide capping layer".

*Journal of Magnetism & Magnetic Materials*, vol. 210, No. 1–3, Feb. 2000 "Enhancement of MR ratios using thin oxide layers in PtMn and $\alpha$–$Fe_2O_3$–based spin valves".

* cited by examiner

Primary Examiner—David L. Ometz
(74) Attorney, Agent, or Firm—Ervin F. Johnston

(57) ABSTRACT

A spin valve sensor is provided with a negative ferromagnetic coupling field $-H_{FC}$ for properly biasing a free layer and a spin filter layer is employed between the free layer and a capping layer for increasing the magnetoresistive coefficient dr/R of the spin valve sensor. A top portion of the free layer is oxidized for improving the negative ferromagnetic coupling field $-H_{FC}$ when the spin filter layer is employed for increasing the magnetoresistive coefficient dr/R.

46 Claims, 15 Drawing Sheets

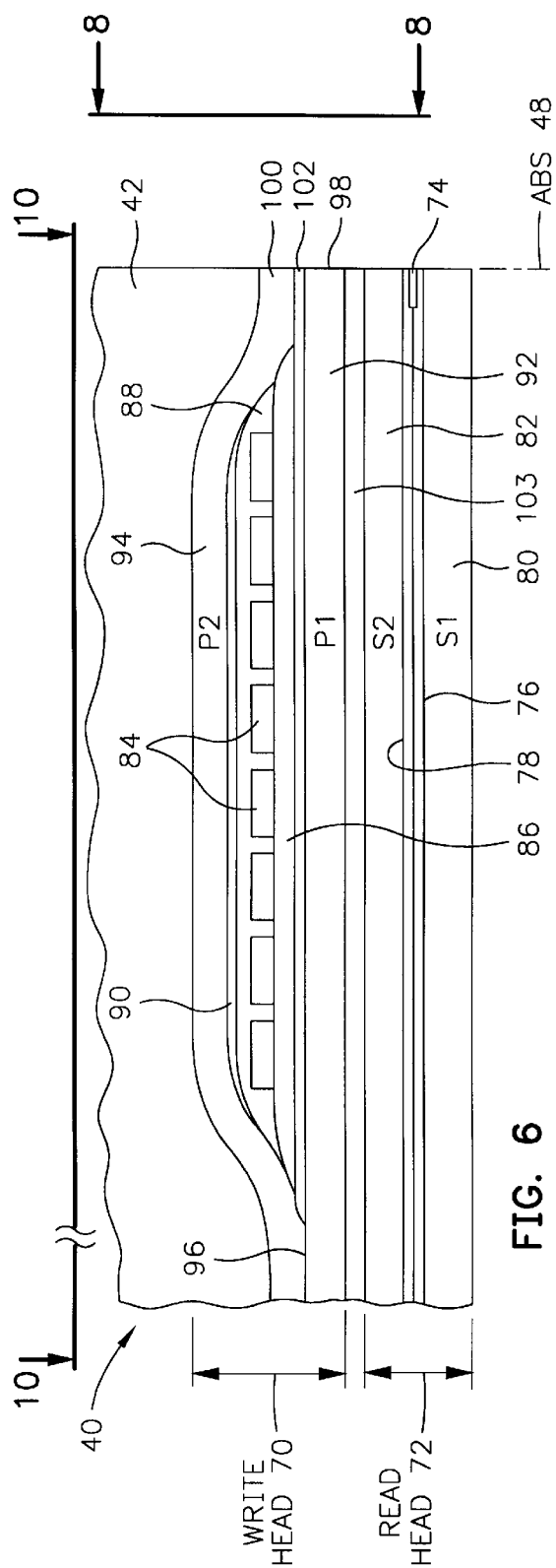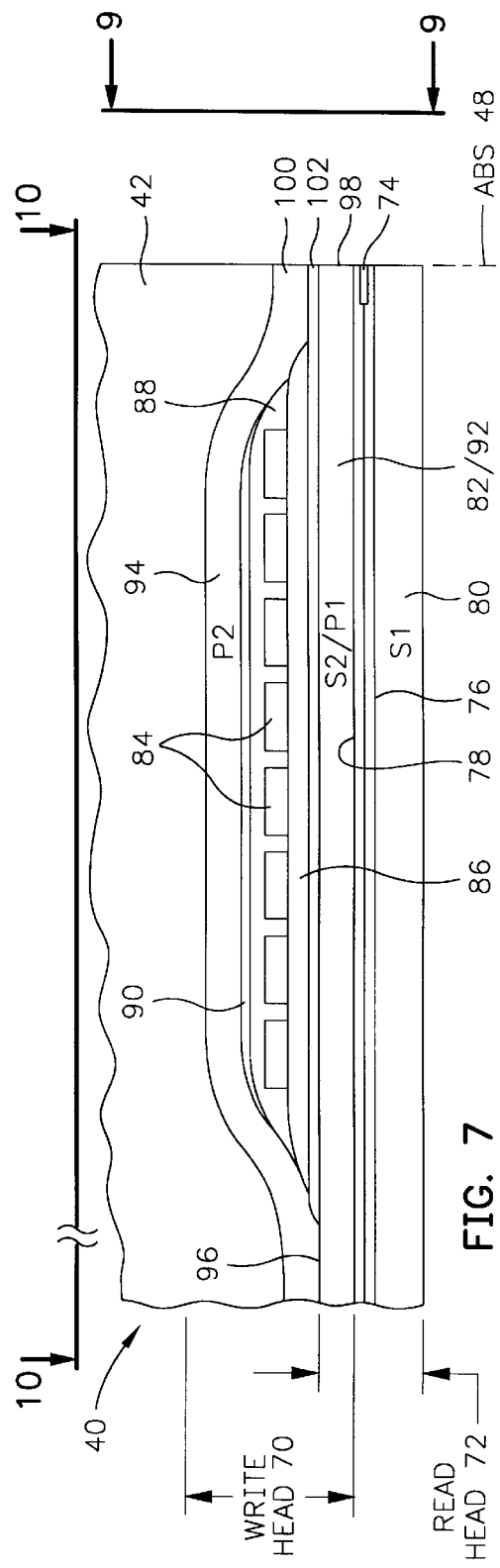

(ABS)

ENHANCED FREE LAYER FOR A SPIN VALVE SENSOR

BACKGROUND OF THE INVENTION

1. Field of the Invention

The present invention relates to an enhanced free layer for a spin valve sensor and, more particularly, to such a free layer and a method of making wherein a desirable negative ferromagnetic coupling field is maintained when a copper layer is located between the free layer and a capping layer for the purpose of increasing a magnetoresistive coefficient dr/R of the spin valve sensor.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic field signals from the rotating disk. The read and write heads are connected to processing circuitry that operates according to a computer program to implement the writing and reading functions.

An exemplary high performance read head employs a spin valve sensor for sensing the magnetic field signals from the rotating magnetic disk. The sensor includes a nonmagnetic electrically conductive spacer layer sandwiched between a ferromagnetic pinned layer and a ferromagnetic free layer. An antiferromagnetic pinning layer interfaces the pinned layer for pinning the magnetic moment of the pinned layer 90° to the air bearing surface (ABS). First and second leads are connected to the spin valve sensor for conducting a sense current therethrough. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is preferably parallel to the ABS, is when the sense current is conducted through the sensor without magnetic field signals from the rotating magnetic disk. If the quiescent position of the magnetic moment is not parallel to the ABS the positive and negative responses of the free layer will not be equal which results in read signal asymmetry, which is discussed in more detail hereinbelow.

The sensitivity of the spin valve sensor is quantified as magnetoresistive coefficient dr/R where dr is the change in resistance of the spin valve sensor from minimum resistance (magnetic moments of free and pinned layers parallel) to maximum resistance (magnetic moments of the free and pinned layers antiparallel) and R is the resistance of the spin valve sensor at minimum resistance. Because of the high magnetoresistance of a spin valve sensor it is sometimes referred to as a giant magnetoresistive (GMR) sensor. Changes in resistance of the spin valve sensor are a function of cos θ, where θ is the angle between the magnetic moments of the pinned and free layers. When a sense current is conducted through the spin valve sensor, resistance changes cause potential changes that are detected and processed as playback signals from the rotating magnetic disk.

The transfer curve for a spin valve sensor is defined by the aforementioned cos θ where θ is the angle between the directions of the magnetic moments of the free and pinned layers. The bias point should be located midway between the top and bottom of the transfer curve. When the bias point is located below the midway point the spin valve sensor is negatively biased and has positive asymmetry and when the bias point is above the midway point the spin valve sensor is positively biased and has negative asymmetry. The location of the transfer curve relative to the bias point is influenced by four major forces on the free layer of a spin valve sensor, namely a ferromagnetic coupling field $H_{FC}$ between the pinned layer and the free layer, a net demagnetizing (demag) field $H_D$ from the pinned layer, a sense current field $H_I$ from all conductive layers of the spin valve except the free layer, a net image current field HIM from the first and second shield layers. The strongest magnetic force on the free layer structure is the sense current field $H_I$.

SUMMARY OF THE INVENTION

In the present invention a negative ferromagnetic coupling field $-H_{FC}$ is obtained for the purpose of counterbalancing other magnetic fields acting on the free layer so as to more adequately position the bias point on the transfer curve of the spin valve sensor. In a preferred embodiment this is accomplished by providing a pinning layer which is composed of platinum manganese (PtMn) and providing a first seed layer composed of nickel manganese oxide (NiMnO) and a second seed layer composed of tantalum (Ta) wherein the first seed layer interfaces the first read gap layer, which is composed of aluminum oxide ($Al_2O_3$), and the second seed layer is located between the first seed layer and the pinning layer. The invention further includes a copper (Cu) layer which is located between the free layer and a capping layer wherein the capping layer is preferably tantalum (Ta). The purpose of the copper (Cu) layer, which is also referred to as a spin filter layer, is to increase the magnetoresistive coefficient dr/R. Unfortunately, the spin filter layer reduces the magnitude of the negative ferromagnetic coupling field which is being sought for proper balancing of the free layer. Further, the spin filter layer can result in a decrease of the magnetoresistive coefficient dr/R instead of an increase.

The present invention obviates reduction of the negative ferromagnetic coupling field by oxidizing a top of the free layer before formation of the capping layer. This may be accomplished by first sputter depositing the top of the free layer, which may be nickel iron (NiFe) or cobalt iron (CoFe) or cobalt (Co), and then introducing oxygen into a sputtering chamber for oxidizing the top of the deposited layer. Accordingly, the free layer has an oxidized film portion and an unoxidized film portion wherein the oxidized film portion is located between the unoxidized film portion and the capping layer. In my experiments I have shown that without the spin filter layer the negative ferromagnetic coupling field $-H_{FC}$ is about −16 Oe, that when the spin filter layer is added the negative ferromagnetic coupling field $-H_{FC}$ is degraded to about −8 Oe, and that when the top of a nickel iron (NiFe) free layer is oxidized before forming the capping layer that the negative ferromagnetic coupling field $-H_{FC}$ is restored to −16 Oe. Further studies optimized the magnetoresistive coefficient dr/R of the present invention by appropriately sizing the thickness of the copper layer. The magnetoresistive coefficient dr/R was maximized when the thickness of the copper layer was about 6 Å. The invention also includes oxidizing fully or a top portion of the copper layer and/or oxidizing top portions of multiple films of the free layer and capping layers.

Another aspect of the invention is that when the copper spacer layer of the spin valve sensor is made thinner the dr/R is increased. However, when the thickness of the spacer layer is decreased the ferromagnetic coupling field increases which may adversely affect the biasing of the free layer. The present invention enables the spin filter layer to be employed for increasing the dr/R in combination with a thinner spacer layer for further increasing the dr/R. When a negative ferromagnetic coupling field $-H_{FC}$ of $-16$ Oe is obtained by the present invention the more positive ferromagnetic coupling field due to a thinner spacer layer is offset by the $-16$ Oe. A resultant $-8$ Oe or lower can still be used effectively for properly biasing the free layer.

An object of the present invention is to provide a spin valve sensor wherein a negative ferromagnetic coupling field $H_{FC}$ is not degraded when a copper layer is employed between a free layer and a capping layer for the purpose of increasing the magnetoresistive coefficient dr/R of the spin valve sensor.

Another object is to accomplish the foregoing object as well as appropriately sizing the copper layer so as to optimize the magnetoresistive coefficient dr/R.

Other objects and attendant advantages of the invention will be appreciated upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
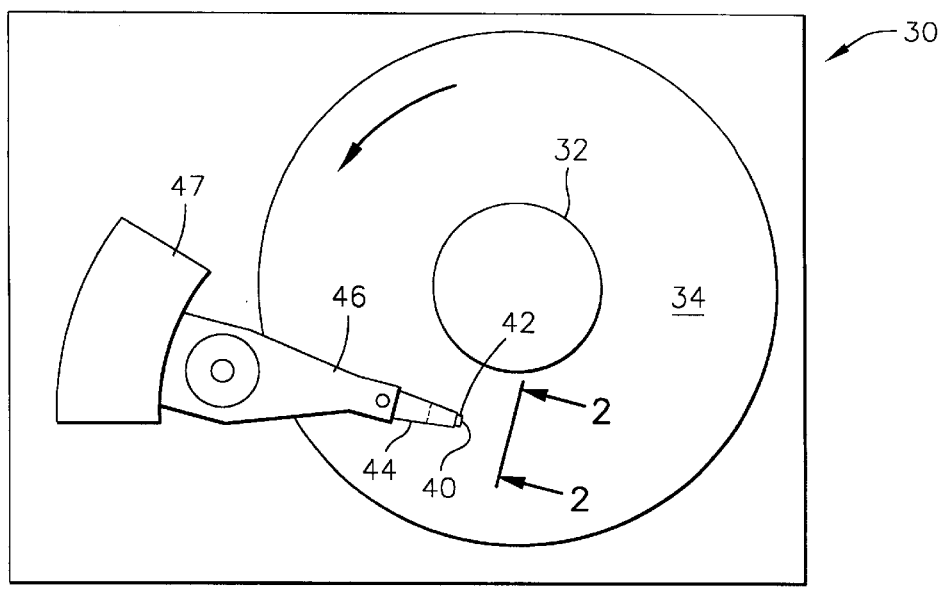
FIG. 1 is a plan view of an exemplary magnetic disk drive.
Figure 2:
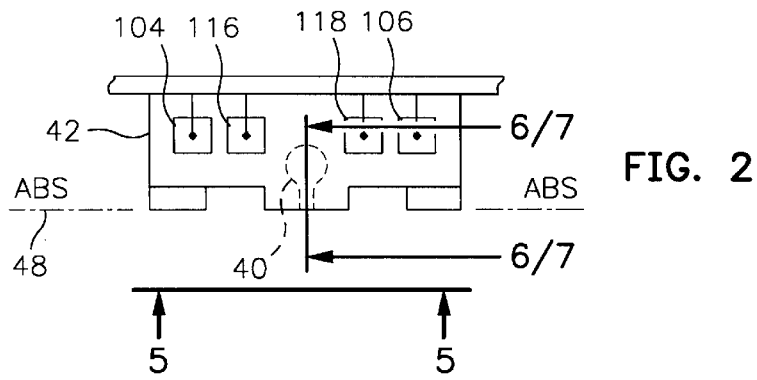
FIG. 2 is an end view of a slider with a magnetic head of the disk drive as seen in plane 2—2 of FIG. 1.
Figure 3:
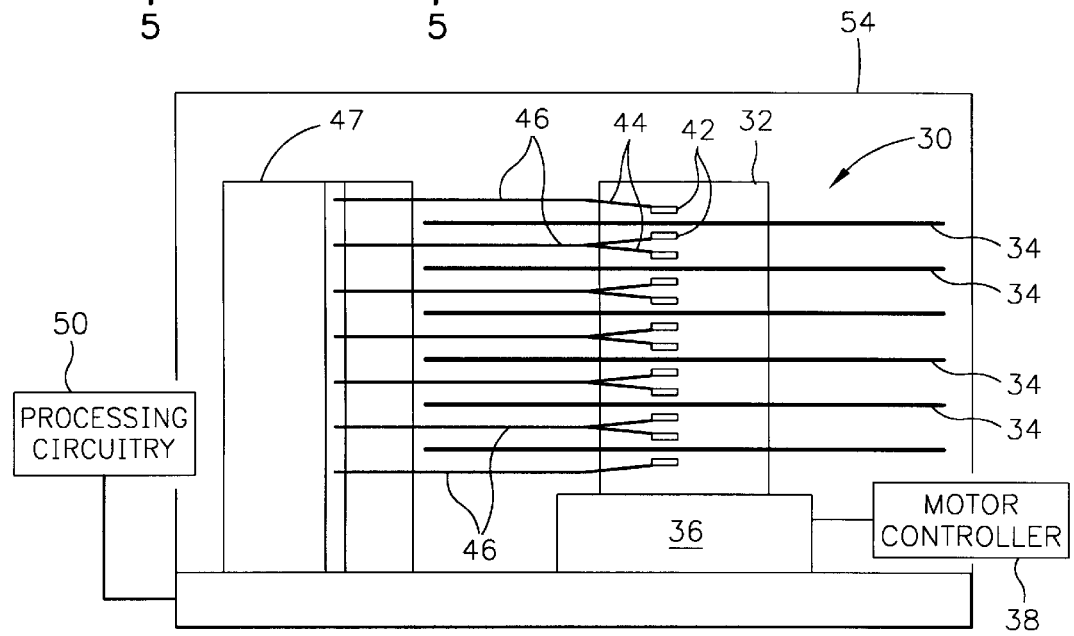
FIG. 3 is an elevation view of the magnetic disk drive wherein multiple disks and magnetic heads are employed.
Figure 4:
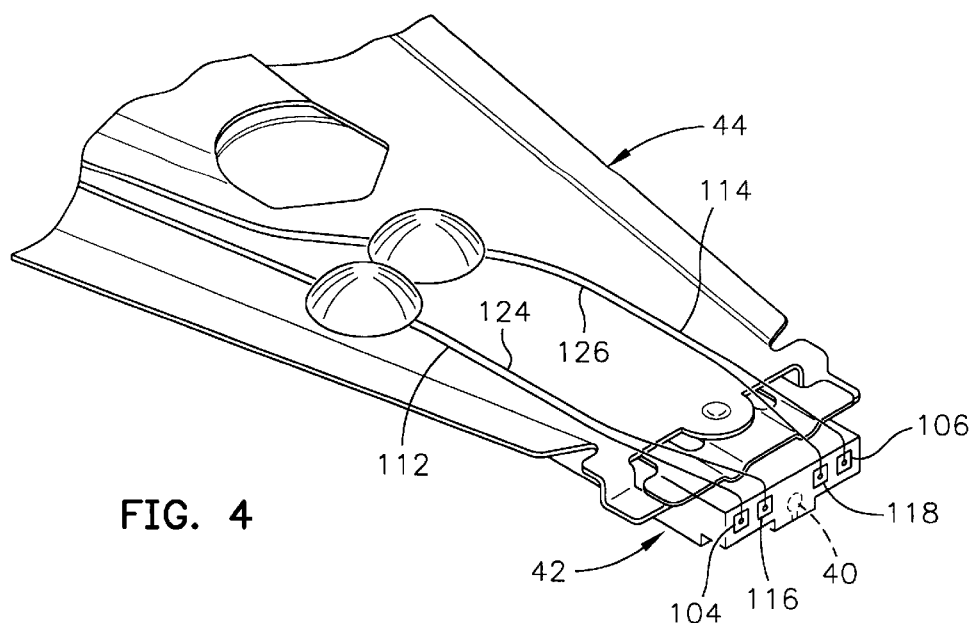
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
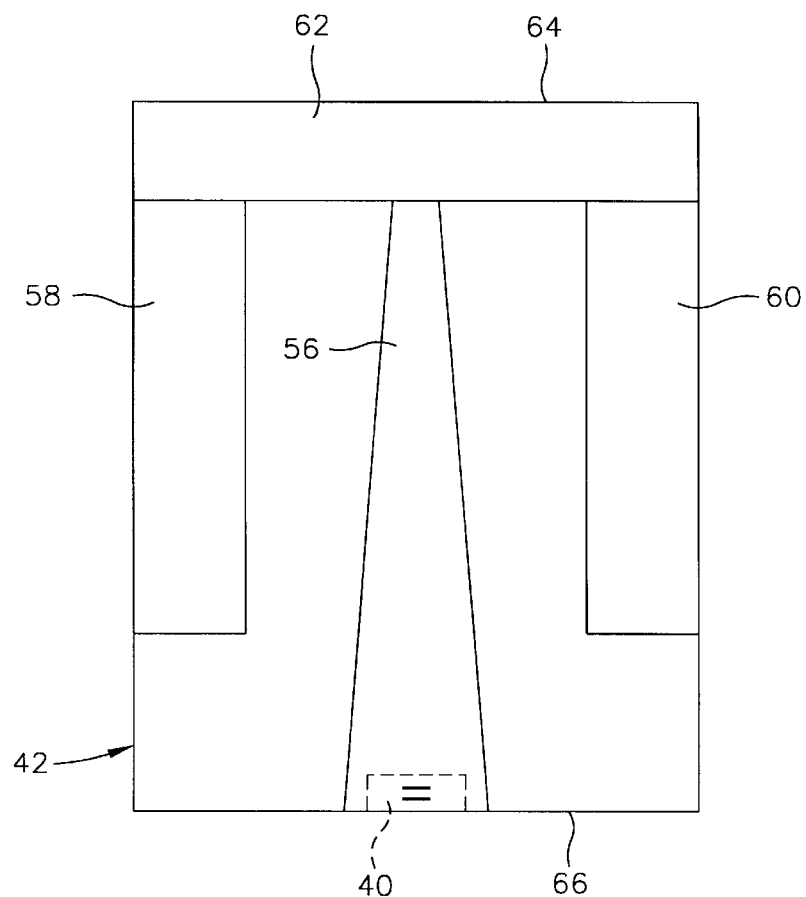
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
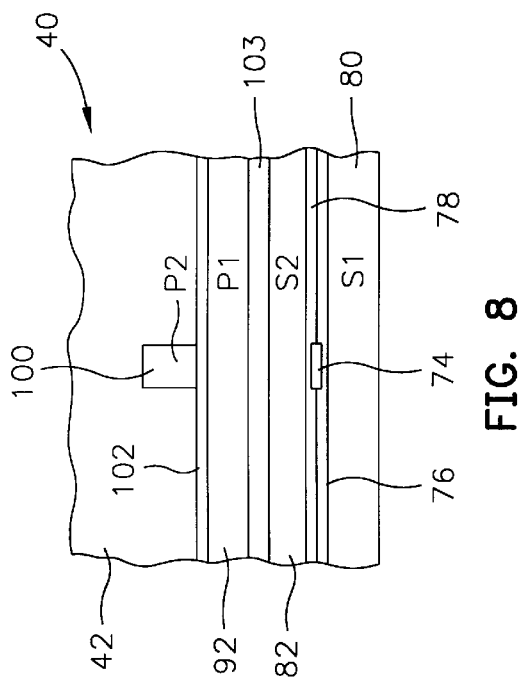
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a dual spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_s$ conducted through the sensor causes these resistance changes to be manifested as potential changes. These potential changes are then processed as readback signals by the processing circuitry 50 shown in FIG. 3.

Figure 10:
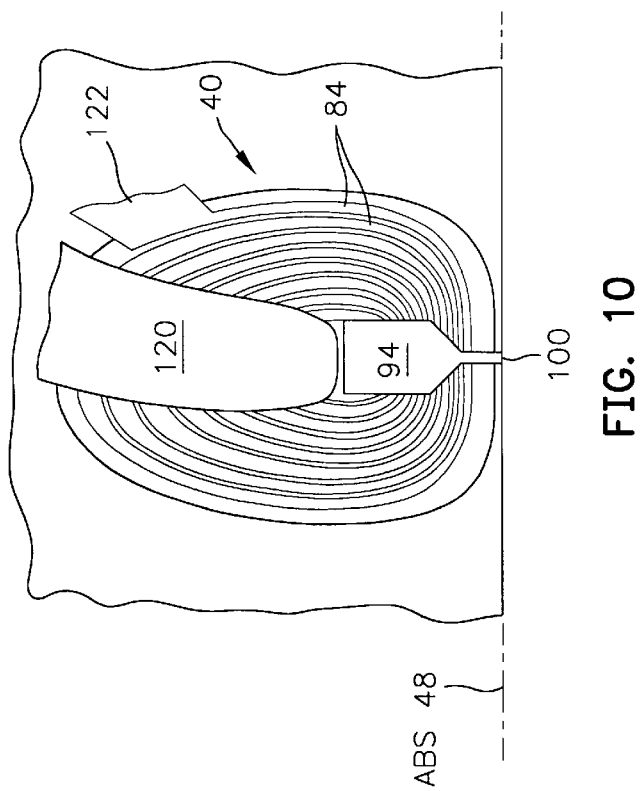
FIG. 10 is a view taken along plane 10—10 of FIG. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
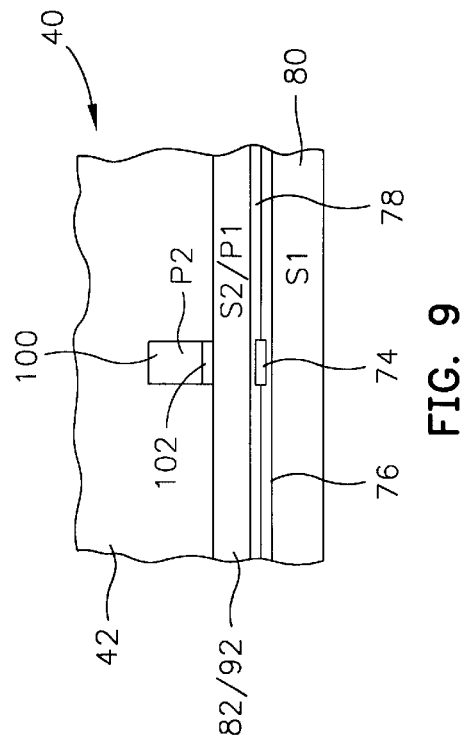
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
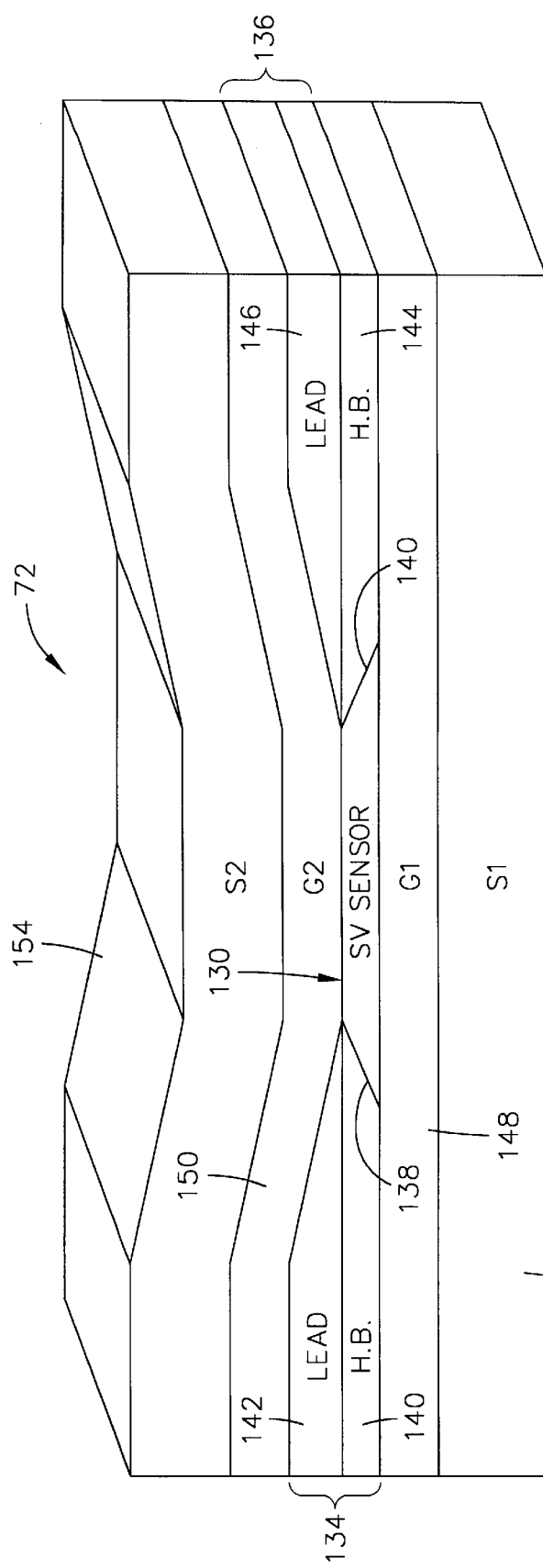
FIG. 11 is an enlarged isometric illustration of a read head which has a spin valve sensor.

FIG. 11 is an isometric ABS illustration of the read head 72 shown in FIG. 6 or 8. The read head 72 includes the present dual spin valve sensor 74 which is located on an antiferromagnetic (AFM) pinning layer 132. First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing the magnetic domains therein. The spin valve sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154.

EXAMPLE 1

Figure 12:
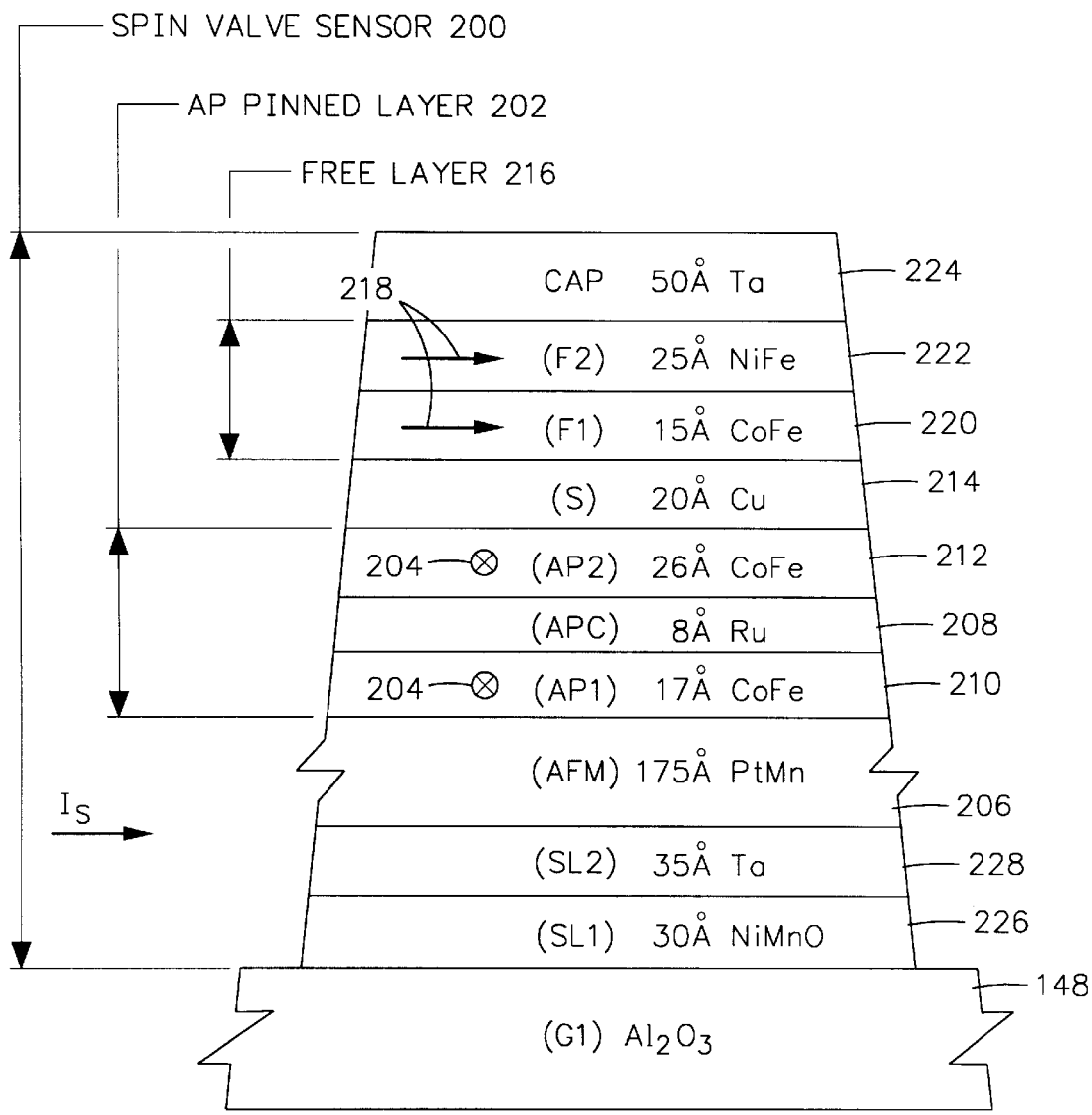
FIG. 12 is an ABS illustration of a spin valve sensor wherein a negative ferromagnetic coupling field $-H_{FC}$ is obtained.

FIG. 12 shows a spin valve sensor 200 which is located on the first read gap (G1) 148 wherein the first read gap is composed of aluminum oxide ($Al_2O_3$). The spin valve sensor 200 includes a pinned layer 202 which has a magnetic moment 204 which is pinned by an antiferromagnetic (AFM) pinning layer 206. The magnetic moment 204 is pinned perpendicular to the ABS in a direction toward the ABS or away from the ABS, as shown in FIG. 12. In this example the pinned layer was an antiparallel (AP) pinned layer which included an antiparallel coupling layer (APC) 208 which was located between ferromagnetic first and second antiparallel layers (AP1) and (AP2) 210 and 212. A spacer layer (S) 214 is located between the second AP pinned layer 212 and a free layer 216 which has a magnetic moment 218 which is oriented parallel to the ABS and parallel to the major thin film surfaces of the layers when the bias point of the spin valve sensor is located midway on its transfer curve. The free layer 216 includes first and second free films (F1) and (F2) 220 and 222. On top of the second free film 222 is a cap layer 224. First and second seed layers (SL1) and (SL2) 226 and 228 are provided between the first read gap layer 148 and the pinning layer 206 with the second seed layer 228 being located between the first seed layer 226 and the pinning layer 206.

Exemplary thicknesses of the $Al_2O_3$ first read gap layer 146 are 200 Å-700 Å. The thicknesses and materials of the other layers are 30 Å of nickel manganese oxide (NiMnO) for the first seed layer 226, 35 Å of tantalum (Ta) for the second seed layer 228, 175 Å of platinum manganese (PtMn) for the pinning layer 206, 17 Å of cobalt iron (CoFe) for the first AP pinned layer 210, 8 Å of ruthenium (Ru) for the antiparallel coupling layer 208, 26 Å of cobalt iron (CoFe) for the second AP pinned layer 212, 20 Å of copper (Cu) for the spacer layer 214, 15 Å of cobalt iron (CoFe) for the first free film 220, 25 Å of nickel iron (NiFe) for the second free film 222 and 50 Å of tantalum (Ta) for the cap layer 224.

A sense current $I_s$ may be directed from right to left or from left to right as shown in FIG. 12. When a field signal from a rotating magnetic disk rotates the magnetic moment 218 upwardly into the sensor the magnetic moments 204 and 218 become more parallel which reduces the resistance of the sensor to the sense current $I_s$ and when a field signal from the rotating magnetic disk rotates the magnetic moment 218 downwardly out of the sensor the magnetic moments 204 and 218 become more antiparallel which increases the resistance of the sensor to the sense current $I_s$. These increases and decreases in the resistance of the spin valve sensor are processed as playback signals by the processing circuitry 50 in FIG. 3.

Figure 17:
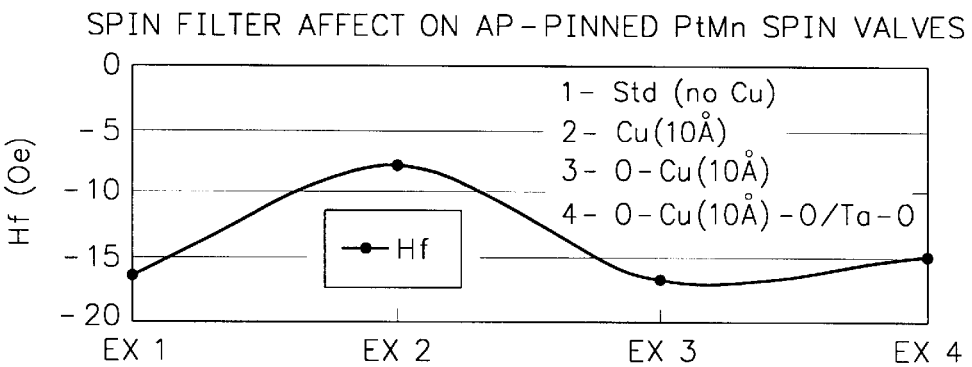
FIG. 17 is a chart showing the change in a negative ferromagnetic coupling field $-H_{FC}$ in various Examples 1–4.
Figure 18:
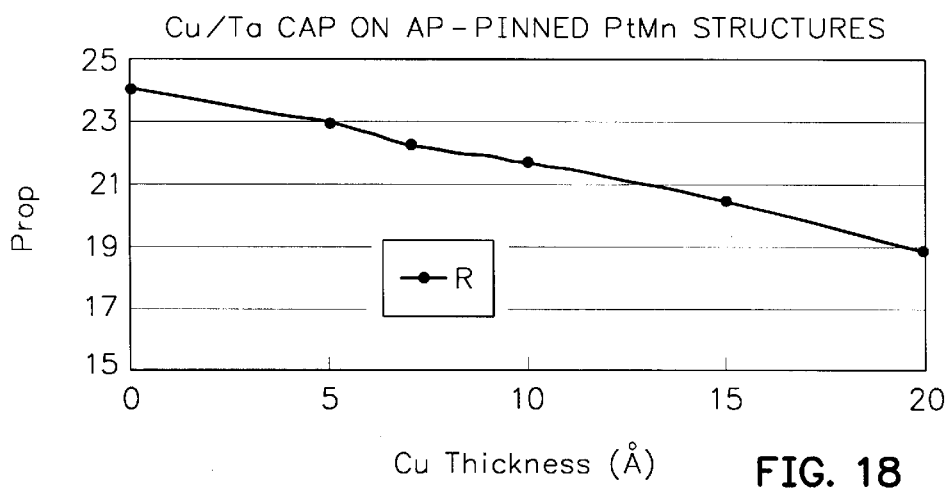
FIG. 18 is a chart showing the change in resistance R of the spin valve sensor with various thicknesses of a copper layer in Example 3.

As discussed in the Summary of the Invention various magnetic forces affect the positioning of the magnetic moment 218 of the free layer. The free layer is properly biased by these magnetic forces when the magnetic moment 218 is parallel to the ABS, as shown in FIG. 12. A negative ferromagnetic coupling field $-H_{FC}$ is desirable for counterbalancing one or more of these magnetic forces for properly biasing the free layer 216. This negative ferromagnetic coupling field has been achieved by employing the pinning layer 206 composed of platinum manganese (PtMn) and the first and second seed layers 226 and 228 which are composed of nickel manganese oxide (NiMnO) and tantalum (Ta) respectively. Further, the first seed layer 226 must interface an aluminum oxide ($Al_2O_3$) first read gap layer 148 or be located on an aluminum oxide ($Al_2O_3$) seed layer which is approximately 30 Å thick. The spin valve sensor 200 in FIG. 12 was tested for its ferromagnetic coupling field $-H_{FC}$ and it was found to be −16 Oe, which is shown at Example 1 in FIG. 17.

It should be noted that when the spacer layer 214 is decreased in thickness that the magnetoresistive coefficient dr/R is increased. However, when the spacer layer 214 is decreased in thickness the ferromagnetic coupling field $-H_{FC}$ increases in a positive direction, which may adversely affect biasing of the free layer 216. Accordingly, the negative ferromagnetic coupling field $-H_{FC}$ of −16 Oe in Example 1 is desirable because the thickness of the spacer layer 214 can now be reduced to increase the dr/R and the increase in the ferromagnetic coupling field due to the thinner spacer layer can be offset by a part of the −16 Oe.

EXAMPLE 2

Figure 13:
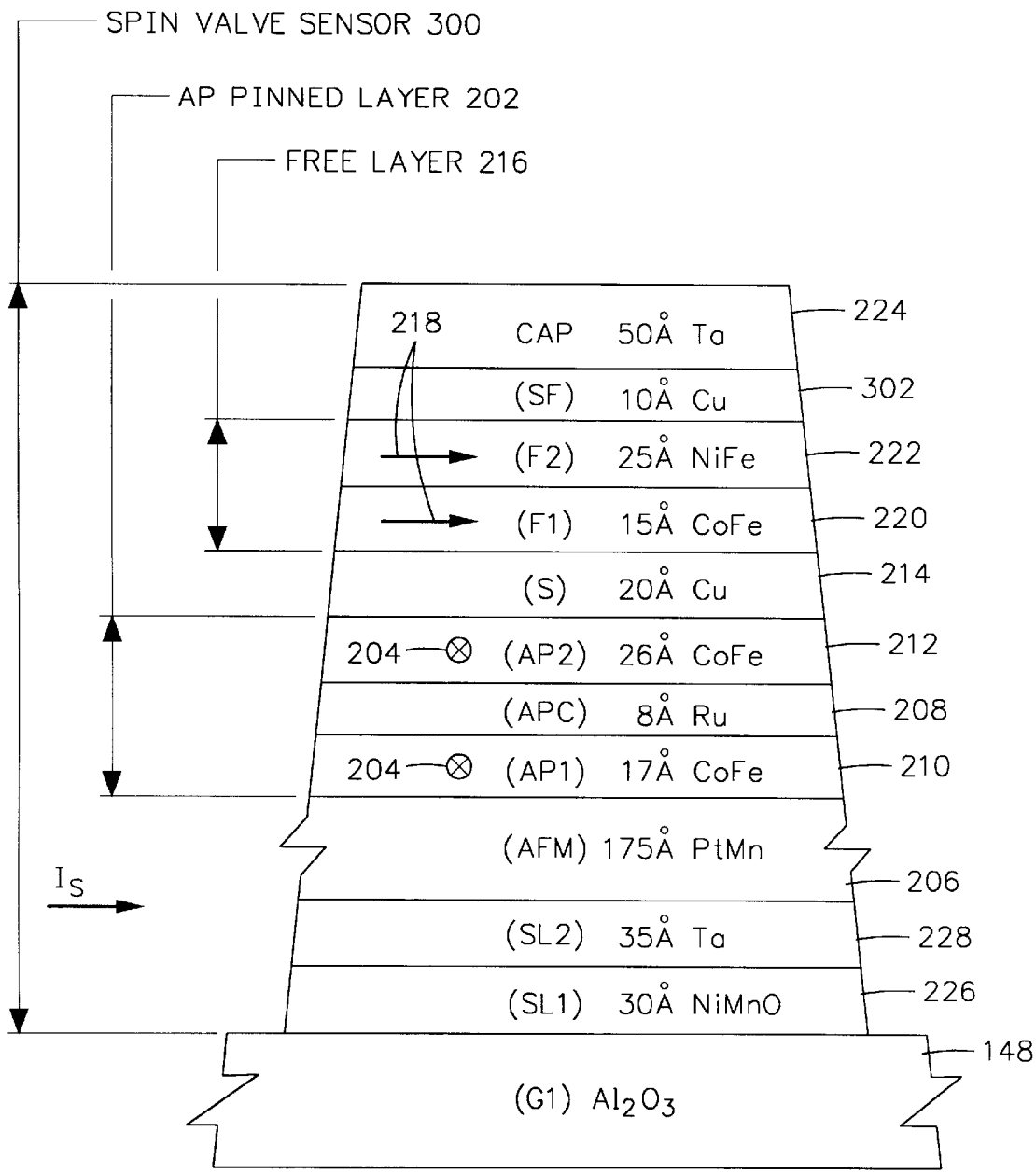
FIG. 13 is the same as FIG. 12 except a copper layer is located between the free layer and a capping layer.

FIG. 13 shows a spin valve sensor 300 which is the same as the spin valve sensor 200 in FIG. 12 except a spin filter layer (SF) 302 is located between the second free film 222 and the cap layer 224. Upon testing the spin valve sensor 300 it was found that the negative ferromagnetic coupling field $-H_F$ was −8 Oe as shown by Example 2 in FIG. 17. It can be seen that the negative magnetic coupling field of Example 2 had dropped by 50% as compared to the negative ferromagnetic coupling field $-H_F$ for Example 1 in FIG. 12. The thickness and material of the spin filter layer 302 was 10 Å of copper (Cu). While a negative ferromagnetic coupling field $-H_{FC}$ of −8 Oe may be desirable for biasing the free layer 216, it is too low to provide any offset when the thickness of the spacer layer 214 is decreased for the purpose of further increasing the dr/R.

EXAMPLE 3

Figure 14:
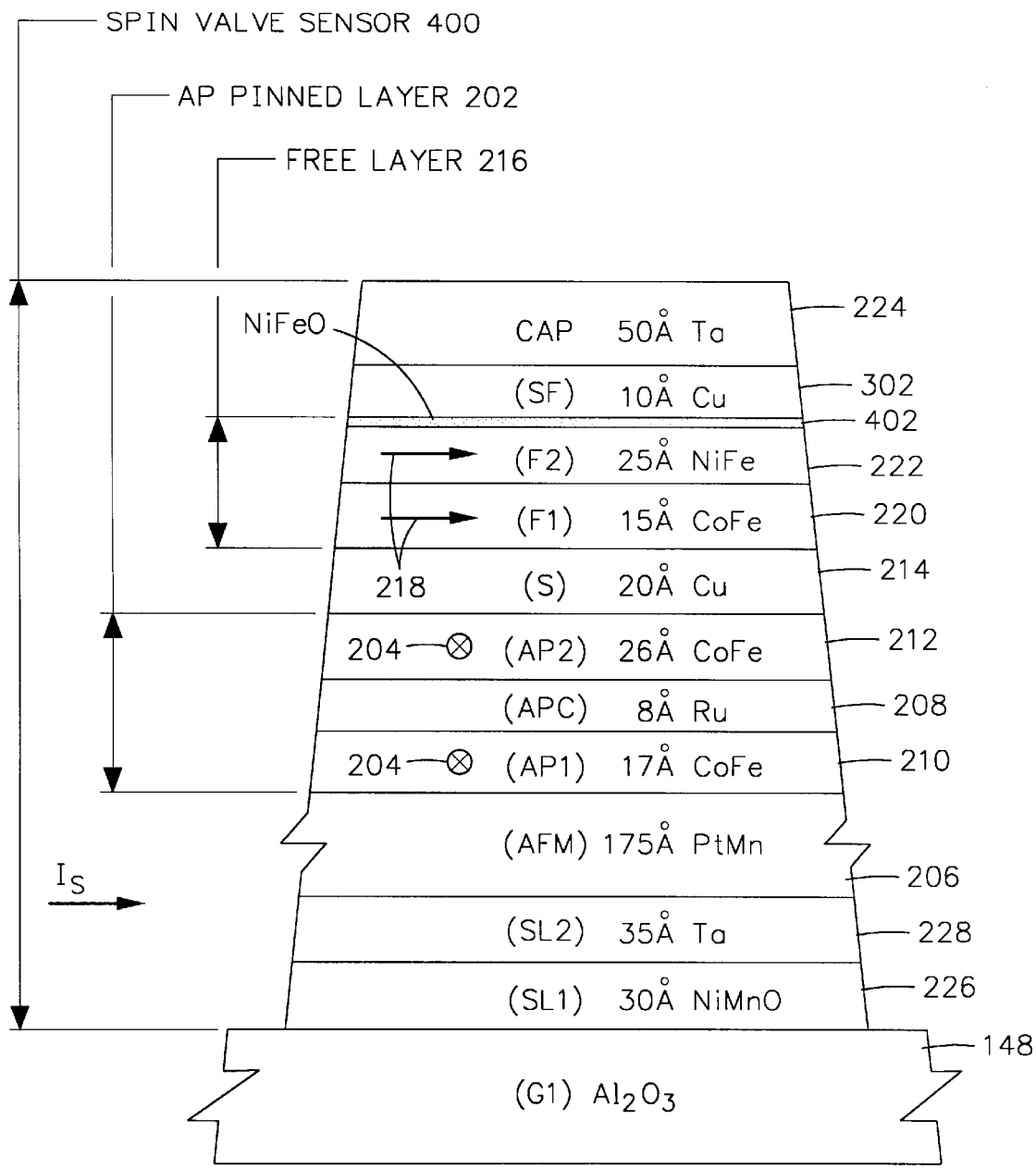
FIG. 14 is the same as FIG. 13 except a top portion of the free layer has been oxidized.

The spin valve sensor 400 in FIG. 14 is the same as the spin valve sensor 300 in FIG. 13 except a top portion 402 of the second free film 222 has been oxidized. Accordingly, the second free film has an unoxidized portion 222 of nickel iron (NiFe) and an oxidized portion 402 which is composed of nickel iron oxide (NiFeO). The oxidized film portion 402 is located directly between the unoxidized film portion 222 and the spin filter layer 302. After sputter depositing the second free film 222 oxygen was exposed into the sputtering chamber and the second film was exposed to the oxygen for 30 seconds at approximately $2 \times 10^{-5}$ Torr. This exposure caused the oxidized portion 402 to develop. The spin valve sensor 400 was tested for its negative ferromagnetic coupling field $-H_{FC}$ and it was found to be −16 Oe which is shown at Example 3 in FIG. 17. Accordingly, the present invention, shown in FIG. 14, completely restored the negative ferromagnetic coupling field to a value obtained in Example 1 so that the spin filter layer 302 can be employed for obtaining the advantages of the spin filter layer as explained hereinbelow. It is speculated that the increase in the negative ferromagnetic coupling is due to the fact that the oxidization caused a smoother interface between the layers 222 and 302.

Figure 19:
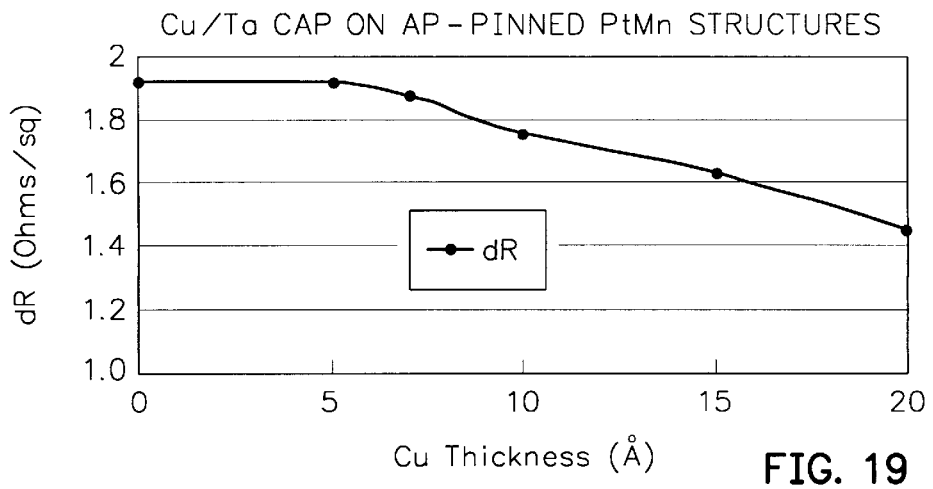
FIG. 19 is a chart showing the change in resistance dr of the spin valve sensor with various thicknesses of the copper layer in Example 3.
Figure 20:
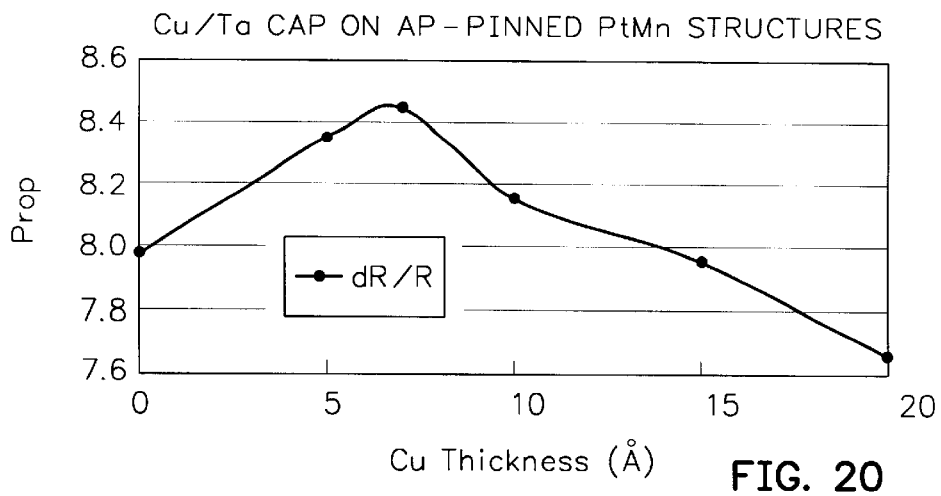
FIG. 20 is a chart showing the change in a magnetoresistive coefficient dr/R of the spin valve sensor with various thicknesses of the copper layer in Example 3.
Figure 21:
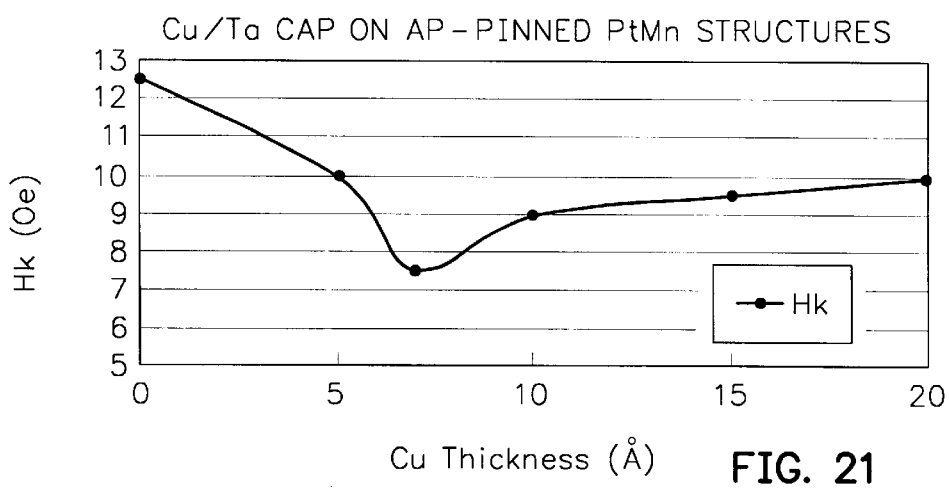
FIG. 21 is a chart showing the change in uniaxial anisotropy field $H_K$ with various thicknesses of the copper layer in Example 3.
Figure 22:
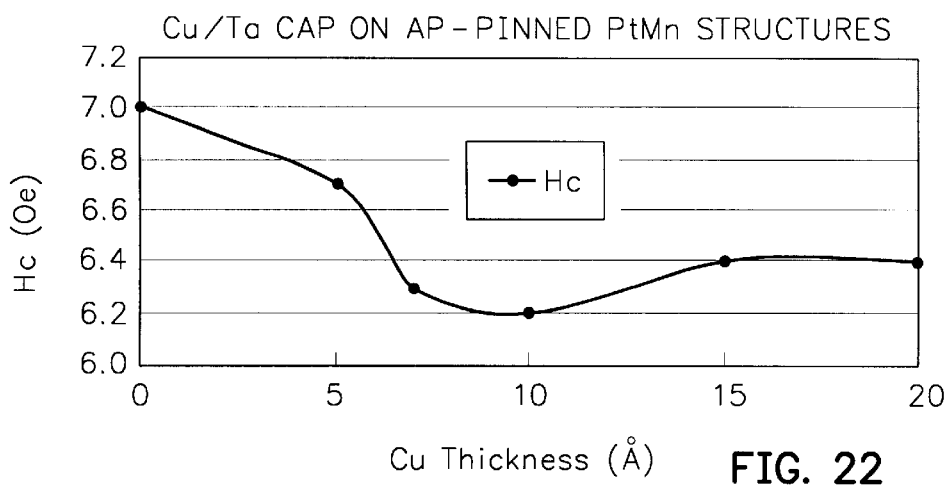
FIG. 22 is a change in easy axis coercivity $H_C$ of a spin valve sensor with various thicknesses of the copper layer in Example 3.

The thickness of the copper layer 302 in FIG. 14 was then varied in order to determine the effect of this thickness on resistance R of the spin valve sensor, the effect on the change in resistance dr of the spin valve sensor, the change on the magnetoresistive coefficient dr/R of the spin valve sensor, the change in uniaxial anisotropy field $H_K$ of the spin valve sensor and the change in easy axis coercivity $H_C$ of the spin valve sensor, as shown in FIGS. 17–20, respectively. The thickness of the spin filter layer 302 was tested without the spin filter layer and then with thicknesses of the spin filter layer of 5 Å, 10 Å, 15 Å and 20 Å. Without the spin filter it can be seen from FIG. 18 that the resistance R was 24, that from FIG. 19 the change in resistance dr was 1.9, from FIG. 20 that the magnetoresistive coefficient dr/R was 8, from FIG. 21 that the uniaxial anisotropy field $H_K$ was 12.5 and from FIG. 22 that the easy axis coercivity $H_K$ was 7. When the spin filter layer was 5 Å thick the resistance R was 23, the change in resistance dr was 1.9, the magnetoresistive coefficient dr/R was 8.3, the uniaxial anisotropy field $H_K$ was 10 Oe and the coercivity $H_C$ was 6.7 Ge, as shown in FIGS. 17–20, respectively. When the thickness of the spin filter layer was increased to 10 Å the resistance R was 22, the change in resistance dr was 1.75, the magnetoresistive coefficient dr/R was 8.15, the uniaxial anisotropy field $H_K$ was 9 Ge and the coercivity $H_K$ was 6.2 Ge, as shown in FIGS. 17–20, respectively. When the thickness of the spin filter layer was increased to 15 Å the resistance R was 20.5, the change in resistance dr was 1.6, the magnetoresistive coefficient dr/R was 7.95, the uniaxial anisotropy field $H_K$ was 9.5 Oe and the coercivity $H_C$ was 15 Ge, as shown in FIGS. 17–20, respectively. When the thickness of the spin filter layer was further increased to 20 Å the resistance R was 19, the change in resistance dr was 1.45, the magnetoresistive coefficient dr/R was 7.65, the uniaxial anisotropy field $H_K$ was 10 Ge and the coercivity $H_K$ was 6.4 Ge, as shown in FIGS. 17–20. It is desirable that the thickness of the spin filter layer be optimized for maximizing the magnetoresistive coefficient dr/k as shown in FIG. 19. Accordingly, optimum thickness for the spin filter layer is approximately 6 Å which will achieve a magnetoresistive coefficient dr/R of 8.45. It can also be seen Image Page 2 from FIG. 20 that when the thickness of the spin filter layer is 6 Å that the uniaxial anisotropy field $H_K$ is at a minimum at 7.5 Oe. This is desirable so that the free layer has soft magnetic characteristics for responding freely to field signals from the rotating magnetic disk. Further, the coercivity $H_C$ in FIG. 21 is nearer its low point when the thickness of the spin filter layer is about 6 Å. This further indicates that the free layer has soft magnetic properties which are desirable. A desirable range for the thickness of the spin filter layer would be between 5–7 Å, as shown from FIG. 20. When the thickness of the spin filter layer was 6 Å the resistance R was 22, the change in resistance dr was 1.85, the magnetoresistive coefficient dr/R was 8.45, the uniaxial anisotropy field $H_K$ was 7.5 Oe and the coercivity $H_C$ was 6.3 Oe, as shown in FIGS. 19–22, respectively.

EXAMPLE 4

Figure 15:
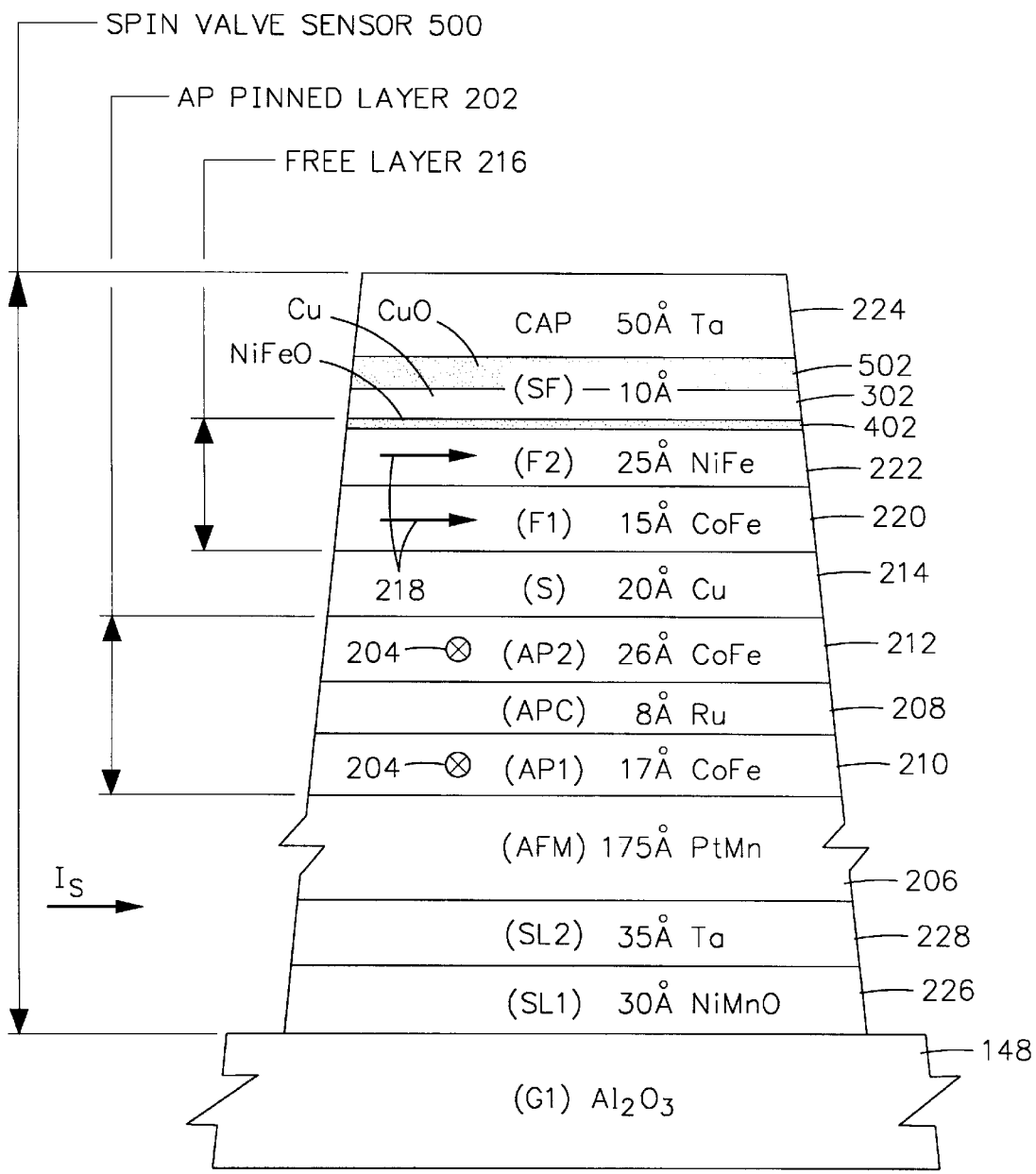
FIG. 15 is the same as FIG. 14 except a top portion of the copper layer is also oxidized.

The spin valve sensor 500 in FIG. 15 is the same as the spin valve sensor 400 in FIG. 14 except a top portion 502 of the spin filter layer 302 has been oxidized. Accordingly, the spin filter layer has an unoxidized film portion of copper (Cu) and an oxidized film portion of copper oxide (CuO) 502. The oxidized film portion 502 is located between the unoxidized film portion 302 and the cap layer 224. Upon testing the spin valve sensor 500 it was found that the negative ferromagnetic coupling field $-H_F$ was −15 Oe as shown in Example 4 in FIG. 17. Accordingly, the negative ferromagnetic coupling field of Example 4 is substantially the same as the negative ferromagnetic coupling field of Example 3.

EXAMPLE 5

Figure 16:
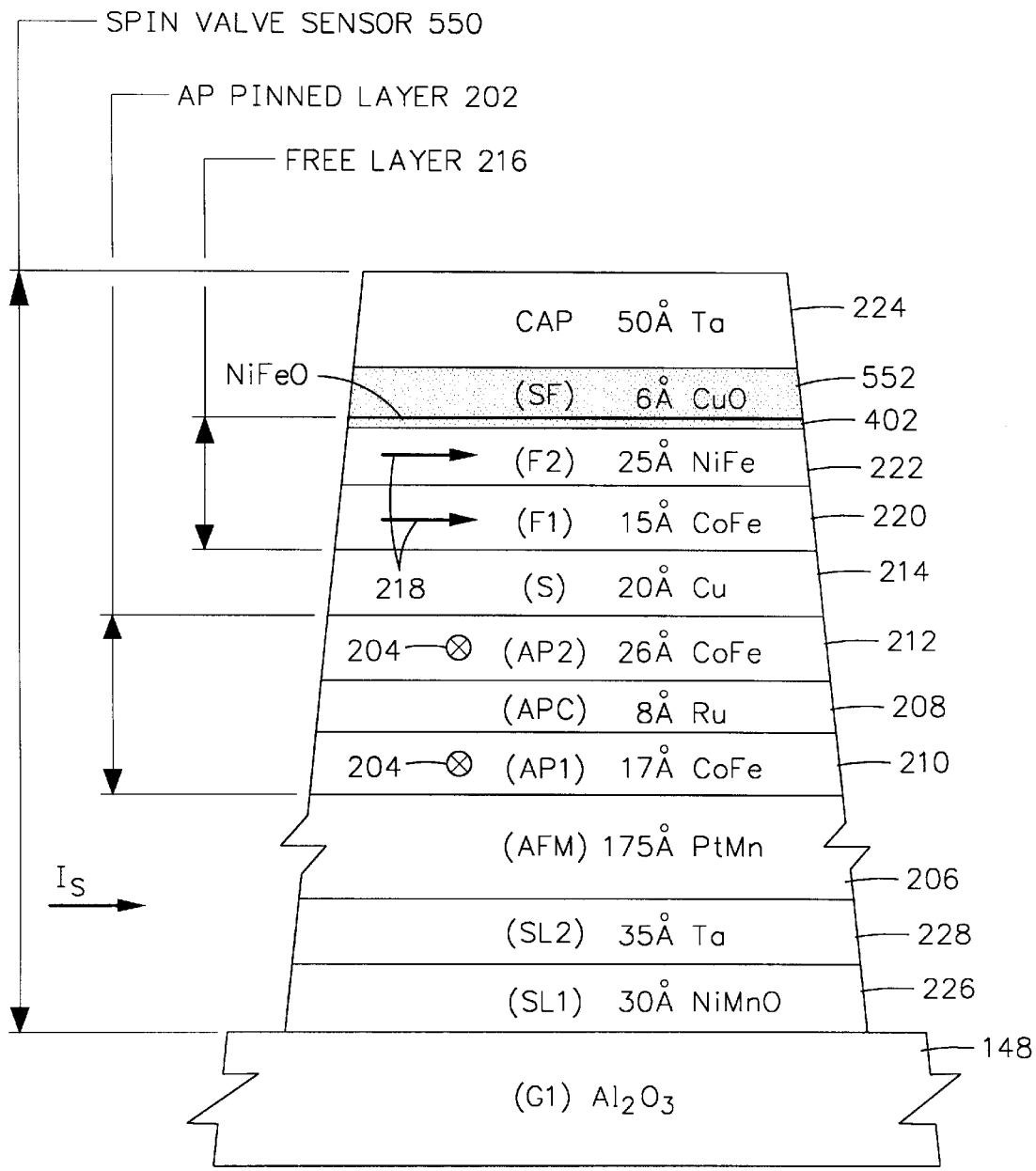
FIG. 16 is the same as FIG. 15 except the copper spacer layer is 6 Å thick instead of 10 Å thick.

The spin valve sensor 550 in FIG. 16 is the same as the spin valve sensor 500 in FIG. 15 except the spin filter layer 552 in FIG. 16 is only 6 Å thick and is shown oxidized throughout its thickness. As stated in Example 3 this thickness is the optimized and preferred thickness for the spin filter layer. This is shown by FIGS. 17–23.

EXAMPLE 6

Figure 23:
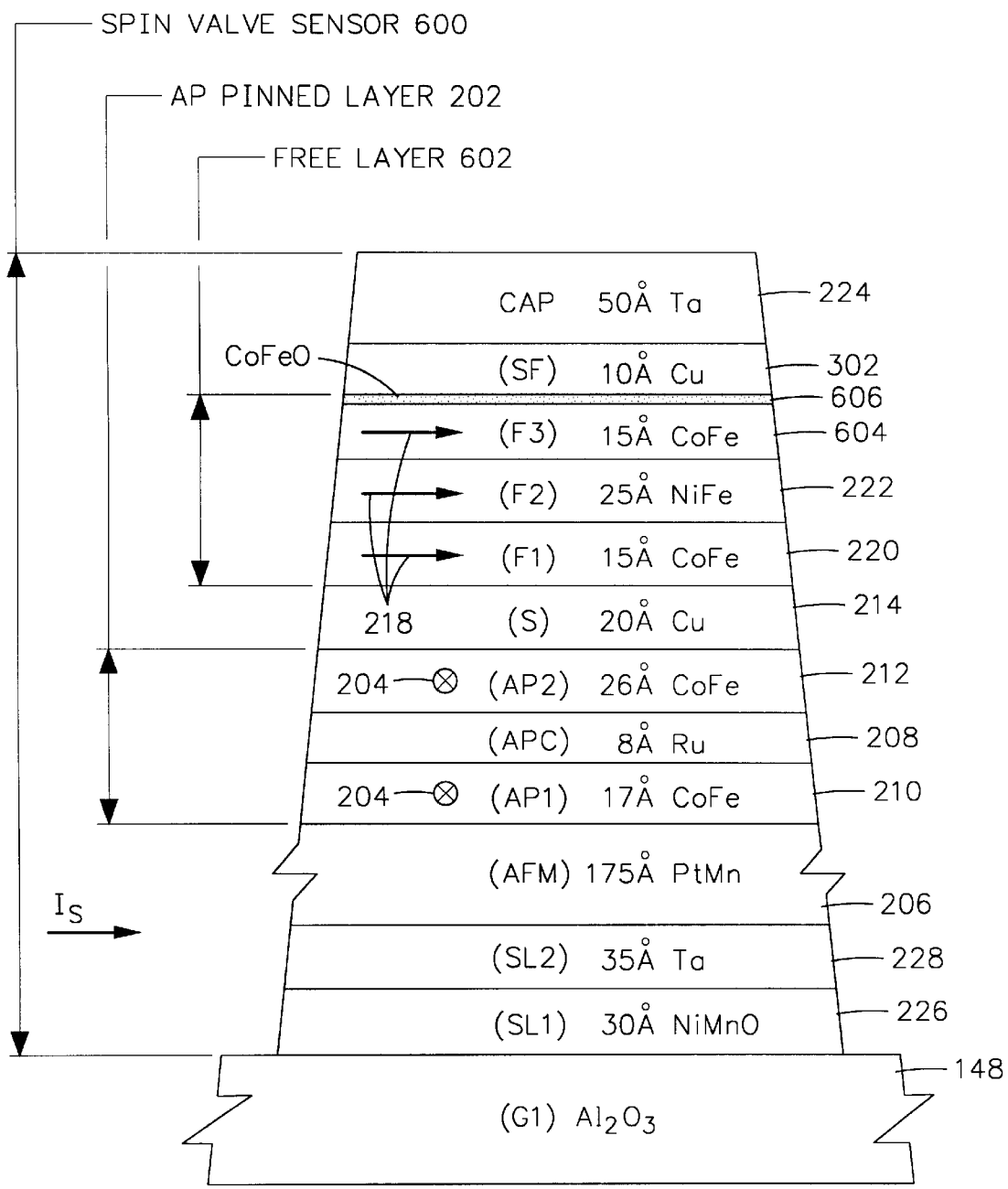
FIG. 23 is an ABS illustration of another embodiment of the invention wherein the free layer has a top film composed of cobalt iron (CoFe) which has a top oxidized portion.

The spin valve sensor 600 in FIG. 23 is the same as the spin valve sensor 550 in FIG. 13 except a free layer 602 is provided which has a third free film (F3) 604 which was deposited as 15 Å of cobalt iron (CoFe). The third free film 604 has an unoxidized film portion of cobalt iron 604 and an oxidized film portion 606 which is cobalt iron oxide (CoFeO).

EXAMPLE 7

Figure 24:
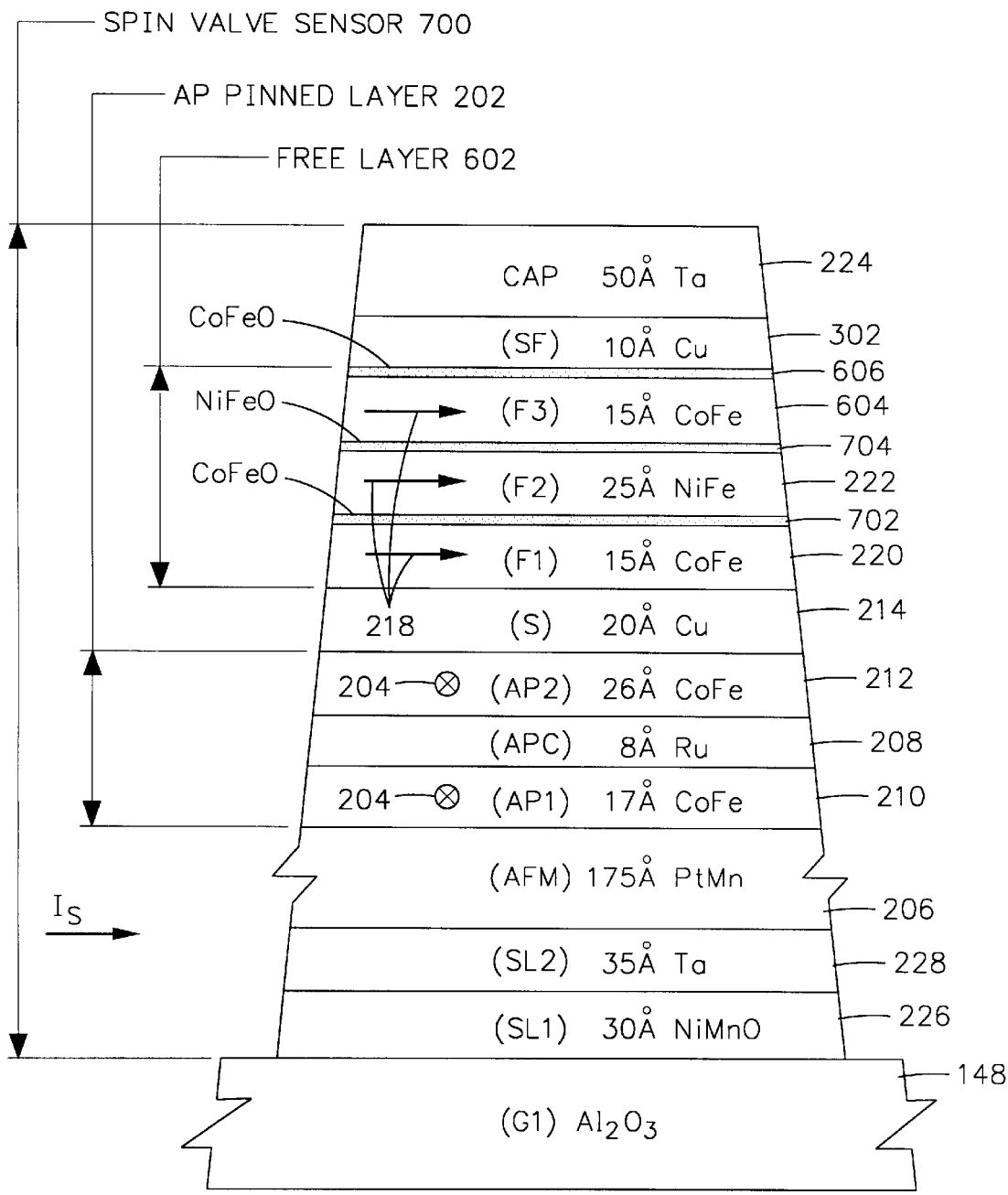
FIG. 24 is the same as FIG. 23 except additional films composed of nickel iron (NiFe) and cobalt iron (CoFe) of the free layer have oxidized portions.

The spin valve sensor 700 in FIG. 24 is the same as the spin valve sensor 600 in FIG. 23 except each of the first and second free films 220 and 222 have an unoxidized portion and an oxidized portion. The first free film 220 has an unoxidized film portion of cobalt iron (CoFe) and an oxidized film portion 702 of cobalt iron oxide (CoFeO). The second film 222 has an unoxidized film portion 222 and an oxidized film portion 704 of cobalt iron oxide (CoFeO).

EXAMPLE 8

Figure 25:
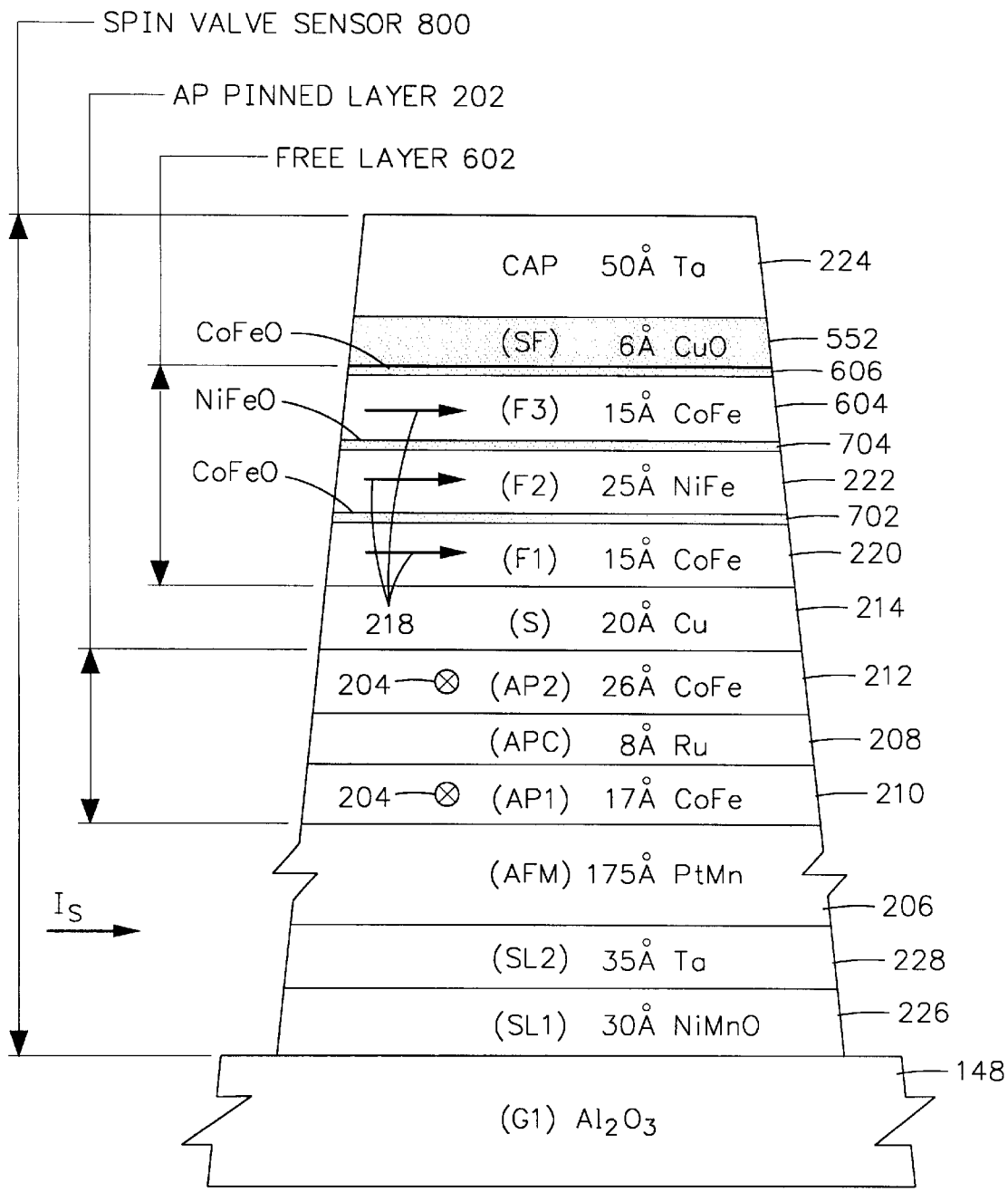
FIG. 25 is the same as FIG. 24 except the copper layer has a top oxidized portion.

The spin valve sensor 800 in FIG. 25 is the same as the spin valve sensor 700 in FIG. 24 except the spin filter layer 552 of FIG. 16 is employed.

Discussion

All of the oxide films may be formed in the same manner as the oxide film 402 in FIG. 14. It should be understood that the forming of the various layers may be accomplished in any type of sputtering system, such as RF or DC sputtering, ion beam sputtering or magnetron sputtering. It should be understood that the tantalum (Ta) 224 in all embodiments may be fully or partially oxidized.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head comprising:
   nonmagnetic nonconductive first and second read gap layers;
   a spin valve sensor located between the first and second read gap layers;
   ferromagnetic first and second shield layers; and
   the first and second read gap layers being located between the first and second shield layers;
   the spin valve sensor including:
   a ferromagnetic pinned layer that has a magnetic moment;
   a platinum manganese pinning layer exchange coupled to the pinned layer for pinning the magnetic moment of the pinned layer structure;
   a free layer;
   a nonmagnetic conductive spacer layer located between the free layer and the pinned layer;
   a capping layer;
   the free layer being located between the spacer layer and the capping layer; the free layer having an oxidized film portion and an unoxidized film portion with the oxidized film portion being located between the unoxidized film portion and the capping layer;
   the unoxidized film portion of the free layer being a nickel iron film and the oxidized film portion of the free layer being a nickel iron oxide film;
   a copper layer located between the oxidized film portion of the free layer and the capping layer;
   first and second seed layers with the first seed layer being composed of nickel manganese oxide and the second seed layer being composed of tantalum;
   the second seed layer being located between the first seed layer and the pinning layer; and
   the first read gap layer being composed of aluminum oxide.

2. A magnetic read head as claimed in claim 1 further comprising:
   the copper layer being fully oxidized or having an oxidized film portion and an unoxidized film portion.

3. A magnetic read head as claimed in claim 1 wherein the copper layer is 4–10 Å thick.

4. A magnetic read head as claimed in claim 3 wherein the capping layer is tantalum.

5. A magnetic read head as claimed in claim 4 wherein the pinned layer is an antiparallel (AP) pinned layer that includes:
   ferromagnetic first and second antiparallel (AP) pinned films with the first AP pinned film interfacing the pinning layer and the second AP pinned film interfacing the spacer layer; and
   an antiparallel (AP) coupling film located between and interfacing the first and second AP pinned films.

6. A magnetic read head comprising:
   nonmagnetic nonconductive first and second read gap layers;
   a spin valve sensor being located between the first and second read gap layers;
   ferromagnetic first and second shield layers; and
   the first and second read gap layers being located between the first and second shield layers;
   the spin valve sensor including;
   a ferromagnetic pinned layer that has a magnetic moment;
   a pinning layer exchange coupled to the pinned layer for pinning the magnetic moment of the pinned layer structure;
   a free layer;
   a nonmagnetic conductive spacer layer located between the free layer and the pinned layer;
   a capping layer;
   the free layer being located between the spacer layer and the capping layer;
   the free layer having an oxidized film portion and an unoxidized film portion with the oxidized film portion being located between the unoxidized film portion and the capping layer;
   the unoxidized film portion of the free layer being a cobalt iron film and the oxidized film portion of the free layer being a cobalt iron oxide film;
   the free layer further including a nickel iron film wherein the nickel iron film is located between the spacer layer and the cobalt iron film; and
   a copper layer located between the oxidized film portion of the free layer and the capping layer.

7. A magnetic read head as claimed in claim 6 wherein the free layer further includes a nickel iron oxide film located between the nickel iron film and the cobalt iron film.

8. A magnetic read head as claimed in claim 6 wherein the free layer further includes a second cobalt iron film and a second cobalt iron oxide film with the second cobalt iron film being located between the spacer layer and the second cobalt iron oxide film and the second cobalt iron oxide film being located between the second cobalt iron film and the nickel iron film.

9. A magnetic head assembly having an air bearing surface (ABS), comprising:
   a write head including;
      ferromagnetic first and second pole piece layers that have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions; and
   a read head including:
      a spin valve sensor;
      nonmagnetic nonconductive first and second read gap layers;
      the spin valve sensor being located between the first and second read gap layers;
      a ferromagnetic first shield layer; and
      the first and second gap layers being located between the first shield layer and the first pole piece layer; and
   the spin valve sensor including:
      a ferromagnetic pinned layer that has a magnetic moment;
      a platinum manganese pinning layer exchange coupled to the pinned layer for pinning the magnetic moment of the pinned layer structure;
      a free layer;
      a nonmagnetic conductive spacer layer located between the free layer and the pinned layer;
      a capping layer;
      the free layer being located between the spacer layer and the capping layer;
      the free layer having an oxidized film portion and an unoxidized film portion with the oxidized film portion being located between the unoxidized film portion and the capping layer;
      the unoxidized film portion of the free layer being a nickel iron film and the oxidized film portion of the free layer being a nickel iron oxide film;
      a copper layer located between the oxidized film portion of the free layer and the capping layer;
      first and second seed layers with the first seed layer being composed of nickel manganese oxide and the second seed layer being composed of tantalum;
      the second seed layer being located between the first seed layer and the pinning layer; and
      the first read gap layer being composed of aluminum oxide.

10. A magnetic head assembly as claimed in claim 9 including:
    a ferromagnetic second shield layer;
    a nonmagnetic isolation layer located between the second shield layer and the first pole piece layer.

11. A magnetic head assembly as claimed in claim 9 further comprising:
    the copper layer is fully oxidized or has an oxidized film portion and an unoxidized film portion.

12. A magnetic head assembly as claimed in claim 9 wherein the copper layer is 4–10 Å thick.

13. A magnetic head assembly as claimed in claim 12 wherein the capping layer is tantalum.

14. A magnetic head assembly as claimed in claim 13 wherein the pinned layer is an antiparallel (AP) pinned layer that includes:
    ferromagnetic first and second antiparallel (AP) pinned films with the first AP pinned film interfacing the pinning layer and the second AP pinned film interfacing the spacer layer; and
    an antiparallel (AP) coupling film located between and interfacing the first and second AP pinned films.

15. A magnetic disk drive that includes at least one magnetic head assembly which has a write head, a read head and an air bearing surface (ABS), comprising:
    the write head including:
       ferromagnetic first and second pole piece layers that have a yoke portion located between a pole tip portion and a back gap portion;
       a nonmagnetic write gap layer located between the pole tip portions of the first and second pole piece layers;
       an insulation stack with at least one coil layer embedded therein located between the yoke portions of the first and second pole piece layers; and
       the first and second pole piece layers being connected at their back gap portions; and
    the read head including:
       a spin valve sensor;
       nonmagnetic nonconductive first and second read gap layers;
       the spin valve sensor being located between the first and second read gap layers;
       a ferromagnetic first shield layer; and
       the first and second read gap layers being located between the first shield layer and
    the first pole piece layer; and
    the spin valve sensor including:
       a ferromagnetic pinned layer that has a magnetic moment;
       a platinum manganese pinning layer exchange coupled to the pinned layer for pinning the magnetic moment of the pinned layer structure;
       a free layer;
       a nonmagnetic conductive spacer layer located between the free layer and the pinned layer;
       a capping layer;
       the free layer being located between the spacer layer and the capping layer;
       the free layer having an oxidized film portion and an unoxidized film portion with the oxidized film portion being located between the unoxidized film portion and the capping layer;
       the unoxidized film portion of the free layer being a nickel iron film and the oxidized film portion of the free layer being a nickel iron oxide film:
       a copper layer located between the oxidized film portion of the free layer and the capping layer;
       first and second seed layers with the first seed layer being composed of nickel manganese oxide and the second seed layer being composed of tantalum;
       the second seed layer being located between the first seed layer and the pinning layer; and
       the first read gap layer being composed of aluminum oxide;
    a housing;
    a magnetic disk rotatably supported in the housing;
    a support mounted in the housing for supporting the magnetic head assembly with said ABS facing the magnetic disk so that the magnetic head assembly is in a transducing relationship with the magnetic disk;
    a spindle motor for rotating the magnetic disk;
    an actuator positioning means connected to the support for moving the magnetic head assembly to multiple positions with respect to said magnetic disk; and a processor connected to the magnetic head assembly, to the spindle motor and to the actuator for exchanging signals with the magnetic head assembly, for controlling movement of the magnetic disk and for controlling the position of the magnetic head assembly.

16. A magnetic disk drive as claimed in claim 15 including:
a ferromagnetic second shield layer;
a nonmagnetic isolation layer located between the second shield layer and the first pole piece layer.

17. A magnetic disk drive as claimed in claim 15 further comprising:
the copper layer being fully oxidized or having an oxidized film portion and an unoxidized film portion.

18. A magnetic disk drive as claimed in claim 15 wherein the copper layer is 4–10 Å thick.

19. A magnetic disk drive as claimed in claim 18 wherein the capping layer is tantalum.

20. A magnetic disk drive as claimed in claim 19 wherein the pinned layer is an antiparallel (AP) pinned layer that includes:
ferromagnetic first and second antiparallel (AP) pinned films with the first AP pinned film interfacing the pinning layer and the second AP pinned film interfacing the spacer layer; and
an antiparallel (AP) coupling film located between and interfacing the first and second AP pinned films.

21. A magnetic read head comprising:
a spin valve sensor including:
a ferromagnetic pinned layer that has a magnetic moment;
a pinning layer exchange coupled to the pinned layer for pinning the magnetic moment of the pinned layer structure;
a free layer;
a nonmagnetic conductive spacer layer located between the free layer and the pinned layer;
a capping layer;
the free layer being located between the spacer layer and the capping layer; the free layer having at least two sublayers of cobalt iron and nickel iron, at least one of said sublayers having an oxidized film portion and an unoxidized film portion with the oxidized film portion being located between the unoxidized film portion and the capping layer; and
a copper layer located between the oxidized film portion of the free layer and the capping layer.

22. A magnetic read head as claimed in claim 21 wherein the unoxidized film portion of the free layer is a nickel iron film and the oxidized film portion of the free layer is a nickel iron oxide film, the cobalt iron film being located between the spacer layer and the nickel iron film.

23. A magnetic read head as claimed in 22 further comprising:
the copper layer having an oxidized film portion and an unoxidized film portion.

24. A magnetic read head as claimed in claim 21 wherein the unoxidized film portion of the free layer is a cobalt iron film adjacent to the nickel iron film, and the oxidized film portion of the free layer is a cobalt iron oxide film.

25. A magnetic read head as claimed in claim 24 wherein the free layer includes a further cobalt iron film located between the spacer layer and the nickel iron film.

26. A magnetic read head as claimed in claim 25 wherein the free layer further includes a nickel iron oxide film located between the nickel iron film and the first mentioned cobalt iron film.

27. A magnetic read head as claimed in claim 24 in which the copper layer is fully oxidized.

28. A magnetic read head as claimed in claim 27 wherein the copper layer is 5 Å to 7 Å thick.

29. A magnetic head assembly having an air bearing surface (ABS) comprising:
a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
a read head having a spin valve sensor which includes:
a ferromagnetic pinned layer that has a magnetic moment;
a pinning layer exchange coupled to the pinned layer for pinning the magnetic moment of the pinned layer structure;
a free layer;
a nonmagnetic conductive spacer layer located between the free layer and the pinned layer;
a capping layer;
the free layer being located between the spacer layer and the capping layer;
the free layer having at least two sublayers of cobalt iron and nickel iron, at least one of said sublayers having an oxidized film portion and an unoxidized film portion with the oxidized film portion being located between the unoxidized film portion and the capping layer; and
a copper layer located between the oxidized film portion of the free layer and the capping layer.

30. A magnetic head assembly as claimed in claim 29 wherein the unoxidized film portion of the free layer is a nickel iron film and the oxidized film portion of the free layer is a nickel iron oxide film, the cobalt iron film being located between the spacer layer and the nickel iron film.

31. A magnetic head assembly as claimed in 30 further comprising:
the copper layer having an oxidized film portion and an unoxidized film portion.

32. A magnetic head assembly as claimed in claim 29 wherein the unoxidized film portion of the free layer is a cobalt iron film adjacent to the nickel iron film, and the oxidized film portion of the free layer is a cobalt iron oxide film.

33. A magnetic head assembly as claimed in claim 32 wherein the free layer includes a further cobalt iron film located between the spacer layer and the nickel iron film.

34. A magnetic head assembly as claimed in claim 33 wherein the free layer further includes a nickel iron oxide film located between the nickel iron film and the first mentioned cobalt iron film.

35. A magnetic head assembly as claimed in claim 32 in which the copper layer is fully oxidized.

36. A magnetic read head comprising:
a spin valve sensor including:
a ferromagnetic pinned layer that has a magnetic moment;
a platinum manganese pinning layer exchange coupled to the pinned layer for pinning the magnetic moment of the pinned layer structure;

a free layer;

a nonmagnetic conductive spacer layer located between the free layer and the pinned layer;

a capping layer;

the free layer being located between the spacer layer and the capping layer;

the free layer having an oxidized film portion and an unoxidized film portion with the oxidized film portion being located between the unoxidized film portion and the capping layer;

a copper layer located between the oxidized film portion of the free layer and the capping layer;

first and second seed layers with the first seed layer being composed of nickel manganese oxide and the second seed layer being composed of tantalum; and the second seed layer being located between the first seed layer and the pinning layer.

37. A magnetic read head as claimed in claim 36 further including:

nonmagnetic nonconductive first and second read gap layers;

the spin valve sensor being located between the first and second read gap layers;

ferromagnetic first and second shield layers; and the first and second read gap layers being located between the first and second shield layers.

38. A magnetic read head as claimed in claim 37 wherein the unoxidized film portion of the free layer is a cobalt iron film and the oxidized film portion of the free layer is a cobalt iron oxide film.

39. A magnetic read head as claimed in claim 38 wherein the free layer further includes a nickel iron film wherein the nickel iron film is located between the spacer layer and the cobalt iron film.

40. A magnetic read head as claimed in claims wherein the free layer further includes a nickel iron oxide film located between the nickel iron film and the cobalt iron film.

41. A magnetic read head as claimed in claim 40 further comprising:

the copper layer being fully oxidized or having an oxidized film portion and an unoxidized film portion.

42. A magnetic head assembly having an air bearing surface (ABS), comprising:

a write head including:

ferromagnetic first and second pole piece layers that have a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions; and a read head including:

a spin valve sensor;

nonmagnetic nonconductive first and second read gap layers;

the spin valve sensor being located between the first and second read gap layers;

a ferromagnetic first shield layer; and the first and second gap layers being located between the first shield layer and the first pole piece layer; and the spin valve sensor including:

a ferromagnetic pinned layer that has a magnetic moment;

a platinum manganese pinning layer exchange coupled to the pinned layer for pinning the magnetic moment of the pinned layer structure;

a free layer;

a nonmagnetic conductive spacer layer located between the free layer and the pinned layer;

a capping layer;

the free layer being located between the spacer layer and the capping layer;

the free layer having an oxidized film portion and an unoxidized film portion with the oxidized film portion being located between the unoxidized film portion and the capping layer;

a copper layer located between the oxidized film portion of the free layer and the capping layer;

first and second seed layers with the first seed layer being composed of nickel manganese oxide and the second seed layer being composed of tantalum;

the second seed layer being located between the first seed layer and the pinning layer; and the first read gap layer being composed of aluminum oxide.

43. A magnetic head assembly as claimed in claim 42 wherein the unoxidized film portion of the free layer is a cobalt iron film and the oxidized film portion of the free layer is a cobalt iron oxide film.

44. A magnetic head assembly as claimed in claim 43 wherein the free layer further includes a nickel iron film wherein the nickel iron film is located between the spacer layer and the cobalt iron film.

45. A magnetic head assembly as claimed in claim 44 wherein the free layer further includes a nickel iron oxide film located between the nickel iron film and the cobalt iron film.

46. A magnetic head assembly as claimed in claim 45 further comprising:

the copper layer being fully oxidized or having an oxidized film portion and an unoxidized film portion.

* * * * *

UNITED STATES PATENT AND TRADEMARK OFFICE
CERTIFICATE OF CORRECTION

PATENT NO. : 6,700,757 B2
DATED : March 2, 2004
INVENTOR(S) : Pinarbasi

It is certified that error appears in the above-identified patent and that said Letters Patent is hereby corrected as shown below:

Column 15,
Line 36, delete "claims" and substitute therefor -- claim 39 --

Signed and Sealed this

Eighth Day of June, 2004

JON W. DUDAS
*Acting Director of the United States Patent and Trademark Office*